(12) United States Patent
Shang et al.

(10) Patent No.: US 11,507,543 B2
(45) Date of Patent: Nov. 22, 2022

(54) PERMISSIONLESS BLOCKCHAIN CONSENSUS METHOD WITH ADJUSTING BLOCK WEIGHT, SYSTEM AND P2P NETWORK

(71) Applicant: Shanghai Tree-Graph Blockchain Research Institute, Shanghai (CN)

(72) Inventors: Shu Shang, Hangzhou (CN); Chenxing Li, Hangzhou (CN); Peilun Li, Hangzhou (CN); Zhe Yang, Hangzhou (CN); Guang Yang, Hangzhou (CN); Dong Zhou, Hangzhou (CN); Ming Wu, Hangzhou (CN); Fan Long, Hangzhou (CN)

(73) Assignee: Shanghai Tree-Graph Blockchain Research Institute, Shanghai (CN)

(*) Notice: Subject to any disclaimer, the term of this patent is extended or adjusted under 35 U.S.C. 154(b) by 475 days.

(21) Appl. No.: 16/727,977

(22) Filed: Dec. 27, 2019

(65) Prior Publication Data
US 2021/0073186 A1 Mar. 11, 2021

(30) Foreign Application Priority Data

Sep. 6, 2019 (CN) .......................... 201910842087.X

(51) Int. Cl.
| | | |
|---|---|---|
| H04L 67/00 | (2022.01) | |
| G06F 16/182 | (2019.01) | |
| H04L 9/06 | (2006.01) | |
| H04L 67/1074 | (2022.01) | |

(52) U.S. Cl.
CPC ........ *G06F 16/1837* (2019.01); *H04L 9/0637* (2013.01); *H04L 67/108* (2013.01)

(58) Field of Classification Search
None
See application file for complete search history.

(56) References Cited

U.S. PATENT DOCUMENTS

2019/0236598 A1* 8/2019 Padmanabhan .... G06Q 20/0655

FOREIGN PATENT DOCUMENTS

WO WO-2017192837 A1 * 11/2017 ........... G06Q 20/065

OTHER PUBLICATIONS

Helland. On Graph Based Cryptocurrency Systems. NTNU. Jun. 2019.*

* cited by examiner

*Primary Examiner* — Tuankhanh D Phan
(74) *Attorney, Agent, or Firm* — Tianchen LLC.; Yuan R. Li; Yi Fan Yin

(57) ABSTRACT

An permissionless blockchain consensus method with adjusting block weight, comprising: setting weights of all blocks in the permissionless blockchain to the same initial value; determining parent edges(forward reference-edges) of any one of blocks in the permissionless blockchain according to the blockchain topology; detecting whether a first judgment block x is in blocks contained by the parent edge of a block b; if yes, determining that the block b is an unstable block and transferring to next step, otherwise, determining the block b is a stable block and transferring to a pivot chain consensus step; and detecting whether a second judgment block y is in the stable block contained by the parent edge of the block b; if yes, determining the block b is a readjusted block and transferring to a weight adjustment step, otherwise, determining the block b is a stable block and transferring to the pivot chain consensus step.

13 Claims, 5 Drawing Sheets

---the prior art---

---the prior art---

---the prior art---

PERMISSIONLESS BLOCKCHAIN CONSENSUS METHOD WITH ADJUSTING BLOCK WEIGHT, SYSTEM AND P2P NETWORK

CROSS-REFERENCE TO RELATED APPLICATION

This application claims priority of Chinese patent application serial No. 201910842087.X, filed Sep. 6, 2019. The entirety of each of the above-mentioned patent applications is hereby incorporated herein by reference and made a part of this specification.

TECHNICAL FIELD

The present disclosure relates to the technical field of internet technology, in particular to an permissionsless blockchain consensus method and system.

BACKGROUND

At present, the blockchain system can be divided into three types: permissionless blockchain systems, public blockchain systems and private blockchain systems:

① Permissionless blockchain system: everyone can participate in a competition for generating a block, such as typical PoW-based consensus protocols, for example, BTC, Ethereum and the like.

② Public blockchain system: everyone can participate in a voting to select authorized objects, such as typical DPoS-based consensus protocols, for example, EOS, Tron and the like.

③ Private blockchain system: the selection of authorized objects is centralized, such as Quorum, Hyper Ledger and other PBFT-based consensus protocols.

In the permissionless blockchain system, everyone can build nodes without the need for authorization and freely compete to generate an new block. In this case, someone may maliciously generate blocks at the same time on different forked chains to make a Balance Attack, result that the weights of the two chains were keeping equivalent, which was difficult to reach consensus on one blockchain for whole network, and a Double Spend Attack would be further marked.

In the permissionless blockchain system, only the PoW-based consensus protocol that has been validated by the market is the one that involves competing to generate blocks. In the PoW-based consensus protocol, the way to improve the Balance Attack cost is to reduce the block-generating rate by increasing the difficulty of the block-generating whether the longest chain rule is adopted or the heaviest chain rule is adopted.

The longest chain rule: in the typical consensus rule such as BTC, a block which's hash value is less than a certain threshold is a legal block, and a legal chain is composed only of legal blocks, and each legal block weight is 1. Starting from a genesis block, a child block with the largest sum of sub-chain weights is always selected from the child blocks as a block on the pivot chain, and the pivot chain can be confirmed downwards in turn, and each node reaches the consensus on the pivot chain according to this scheme. FIG. 1 is a schematic diagram of a pivot chain selected according to the longest chain rule under a typical topology in the prior art.

The heaviest chain rule: in a typical consensus rule such as Ethereum, a block is defined as a legal block when the block hash value is less than a certain threshold, and a legal chain is composed only of legal blocks, and each legal block weight is 1. Starting from a genesis block, a child block with the largest sum of sub-tree weights is always selected from the child blocks as a block on a pivot chain, the pivot chain can be confirmed in turn, and each node reaches a consensus on the pivot chain according to this scheme. FIG. 2 is a schematic diagram of a pivot chain selected according to the heaviest chain rule under a typical topology in the prior art.

FIG. 3 is a schematic diagram of a block topology which is typically under a Balance Attack. As shown in FIG. 3, the Balance Attack is possible to appear whether the longest chain rule or the heaviest chain rule, that is, there are two forked chains growing at an equally matched rate, and the selection of the pivot chain is erratic.

In order to avoid the Balance Attack appears too frequent in the permissionless blockchain, the scheme of reducing the block-generating rate by increasing the difficulty of the block-generating is selected whether the longest chain rule or the heaviest chain rule. When the block-generating rate is very slow, each block node in the network can have enough time to reach the consensus on the current longest chain or the heaviest chain after one block is generated. The block generated from a honest node is linked to the end of the longest chain or the heaviest chain. At this moment, it will need to master 51% of the resources of the whole network for the block-generating if the attacker wants to continue the Balance Attack, which is very costly.

Although the scheme of reducing the block-generating rate can increase the cost of the Balance Attack, it also greatly limits the throughput, so that the TPS (TransactionsPerSecond) of the permissionless blockchain system is severely restricted.

SUMMARY

The present aims to provide a permissionless blockchain consensus method, system and P2P network, which is used for dynamically adjusting the weight of the newly added block according to the topology relationship of blocks in the permissionless blockchain, so as to increase the cost of the Balance Attack without reducing the block-generating rate.

Specifically, the present invention provides an permissionless blockchain consensus method with adjusting block weights, the method comprises:

an initialization step, for setting weights of all blocks in the permissionless blockchain to the same initial value;

an association step, for determining parent edges(forward reference-edges) of any one of the blocks in the permissionless blockchain according to the blockchain topology;

a first determining step, for detecting whether a first judgment block x is in blocks contained by the parent edge of a newly added block b; if yes, determining that the newly added block b is an unstable block and transferring to a second determining step, and otherwise, determining the newly added block b is a stable block and transferring to a pivot chain consensus step; wherein, the first judgment block x is used to judge whether the new block b is stable block, and the first judgment block is x a block whose stability is not up to standard in the parent blocks of the new block x, the fewer direct descendants of the block, the more unstable the block is;

the second determining step, for detecting whether a second judgment block Y is in the stable blocks contained by the parent edge of the newly added block b; if yes, determining the newly added block b is a readjusted block and transferring to a weight adjustment step, otherwise, determining the newly added block b is a stable block and transferring to a pivot chain consensus step; wherein, the second judgment block y is used to judge whether the new block b is healthy block, and the second judgment block y is a block whose healthy degree is not up to standard in the parent blocks of the new block b, the more unstable blocks in the direct descendants of the block, the less healthy the block is;

the weight adjustment step, for adjusting the weight of the readjusted blocks; and the pivot chain consensus step, for selecting a pivot chain of the permissionless blockchain based on the weight of each block according to the blockchain consensus rule.

Preferably, the permissionless blockchain consensus method according to the present invention, wherein for the block set B of the permissionless blockchain, all the blocks which can be reachable by the parent edges(forward reference-edges) of any one block in the block set B, are in the forward block set Past (●) of the any one block in the block set B, and the sum of the weights of all blocks in Past (●) is the sum of the forward weights PastW(●) of the any one block in the block set B; all the blocks referenced by the parent edges of any one block in the block set B, are in the backward block set SubT(●) of the any one block in the block set B, the sum of the weights of all blocks in the SubT(●) is the sum of the backward weights SubTW(B,●) of the any one block in the block set B, and the first determining step specifically comprises:

detecting whether a first judgment block x is in the blocks contained by the parent edge of the newly added block b, so that $f(x)>\beta$ and $g(x)/f(x)<\alpha$ is established;

if yes, the newly added block b is determined to be an unstable block, otherwise, the newly added block b is determined to be a stable block;

wherein, $\alpha$ and $\beta$ are the judgment thresholds, $f(x)=PastW(b)-PastW(x.parent)-x.weight$, $g(x)=SubTW(B,x)$, and x.parent is the parent block of the first judgment block x, x.weight is the weight of the first judgment block x.

Preferably, the permissionless blockchain consensus method according to the present invention, wherein, for block set B, the sum of the weights of stable blocks in all blocks referenced by parent edges of any one of the blocks in the block set B is the sum of the backward stability weights SubTStableW(B,●) of the any one of the blocks in the block set B, and;

the second determining step specifically comprises:

detecting whether there is the second judgment block Y in the stable blocks contained by the parent edge of the newly added block b, so that $SubTW(B, y.parent)>\beta$, and $SubTStableW(B, y)/SubTW(B, y.parent)<\alpha$ is established;

if yes, the newly added block b is determined to be readjusted block, and otherwise, the newly added block b is determined to be a stable block; wherein the y.parent is the parent block of the second judgment block Y.

Preferably, the permissionless blockchain consensus method according to the present invention, wherein, for the block set B of the permissionless blockchain, all the blocks which can be reachable by the parent edge(forward reference-edge) of any one block in the block set B, are in the forward block set Past (●) of the any one block in the block set B, and the sum of all blocks in Past (●) is the sum of the forward blocks in the block set B; all the blocks referenced by the parent edges of any one of the blocks, are in the backward block set SubT(●) of the blocks of any one block in the block set B, the sum of all blocks in the SubT(●) is the sum of the backward blocks of any one block in the block set B, and the first determining step specifically comprises:

detecting whether a first judgment block x is in the blocks contained by the parent edge of the newly added block b, so that $f(x)>\beta$ and $g(x)/f(x)<\alpha$ is established;

if yes, the newly added block b is determined to be an unstable block, otherwise, the newly added block b is determined to be a stable block;

wherein, $\alpha$ and $\beta$ are the judgment thresholds, $f(x)=|Past(b)|-|Past(x.parent)|-1$, $g(x)=|SubT(B, x)|$, and the x.parent is the parent block of the first judgment block x.

Preferably, the permissionless blockchain consensus method according to the present invention, wherein, for block set B, the sum of stable blocks in all blocks referenced by parent edges of any one of the blocks in the block set B is the sum of the backward stability blocks of the any one of the blocks in the block set B, and;

the second determining step specifically comprises:

detecting whether there is the second judgment block y in the stable blocks contained by the parent edge of the newly added block b, so that $SubTW(B, y.parent)>\beta$, and $SubTStableW(B, y)/SubTW(B, y.parent)<\alpha$ is established;

if yes, the newly added block b is determined to be readjusted block, and otherwise, the newly added block b is determined to be a stable block;

wherein y.parent is the parent block of the second judgment blocky.

Preferably, the permissionless blockchain consensus method of the present invention, wherein the weight adjustment step comprises:

receiving all of the readjusted blocks;

comparing the difficulty b.pow_quality of the readjusted block, with the difficulty threshold h·D of the permissionless blockchain one by one;

if $b.pow\_quality \geq h \cdot D$, the weight of the readjusted block is adjusted to h;

if $b.pow\_quality < h \cdot D$, the weight of the readjusted block is adjusted to 0;

wherein, D is the average difficulty of all blocks of the permissionless blockchain, h is the magnification, h>0.

The invention also provides an permissionless blockchain consensus system with adjusting block weights, comprises:

an initialization module, configured to set weights of all blocks in the permissionless blockchain to the same initial value;

an association module, configured to determine a parent edge, a parent edge(forward reference-edge) of each block according to the blockchain topology;

a first determining module, configured to detect whether a first judgment block x is in blocks contained by a parent edge of the newly added block b; if yes, determining the newly added block b is an unstable block, otherwise, determining the newly added block b is a stable block; wherein, the first judgment block x is used to judge whether the new block b is stable block, and the first judgment block is x a block whose stability is not up to standard in the parent block of the new block x, the fewer direct descendants of the block, the more unstable the block is;

a second determining module, configured to detect whether a second judgment block Y is in the stable block contained by the parent edge of the newly added block b; if yes, determining the newly added block b is a readjusted block, otherwise, the newly added block b is a stable block;

wherein, the second judgment blocky is used to judge whether the new block b is healthy block, and the second judgment blocky is a block whose healthy degree is not up to standard in the parent block of the new block b, the more unstable blocks in the direct descendants of the block, the less healthy the block is;

a weight adjustment module, configured to adjust the weight of the readjusted block determined by the second determining module;

a pivot chain consensus module, configured to select the pivot chain of the permissionless blockchain based on the weight of each block according to the blockchain consensus rule.

The permissionless blockchain consensus system of the present invention, wherein for the block set B of the permissionless blockchain, all the blocks which can be reachable by the parent edge(forward reference-edge) of any one block in the block set B, are in the forward block set Past (●) of the any one block in the block set B, and the sum of the weights of all blocks in Past (●) is the sum of the forward weights PastW(●) of the any one block in the block set B; all the blocks referenced by the parent edges of any one of the blocks, are in the backward block set SubT(●) of the any one block in the block set B, the sum of the weights of all blocks in the SubT(●) is the sum of the backward weights SubTW(B,●) of the any one block in the block set B, and the first determining step specifically comprises:

detecting whether there is the first judgment block x in the blocks contained by the parent edge of the newly added block b; so that $f(x) > \beta$ and $g(x)/f(x) < \alpha$ is established;

if yes, the newly added block b is determined to be an unstable block, otherwise, the newly added block b is determined to be a stable block;

wherein, $\alpha$ and $\beta$ are the judgment thresholds, $f(x)=\text{PastW}(b)-\text{PastW}(x.\text{parent})-x.\text{weight}$, $g(x)=\text{SubTW}(B,x)$, and x.parent is the parent block of the first judgment block x, x.weight is the weight of the first judgment block x.

The permissionless blockchain consensus system of the present invention, wherein for block set B, the sum of the weights of stable blocks in all blocks referenced by parent edges of any one of the blocks in the block set B is the sum of the backward stability weights SubTStableW(B,●) of the any one of the blocks in the block set B, and;

the second determining step specifically comprises:

detecting whether there is the second judgment block Y in the stable blocks contained by the parent edge of the newly added block b, so that $\text{SubTW}(B, y.\text{parent}) > \beta$, and $\text{SubTStableW}(B, y)/\text{SubTW}(B, y.\text{parent}) < \alpha$ is established;

if yes, the newly added block b is determined to be readjusted block, and otherwise, the newly added block b is determined to be a stable block; wherein y.parent is the parent block of the second judgment block Y.

Preferably, the permissionless blockchain consensus system of the present invention, wherein wherein the weight adjustment module comprises:

a receiving submodule, for receiving all of the readjusted blocks;

a comparing submodule, for comparing the difficulty b.pow_quality of the readjusted blocks with the difficulty threshold h·D of the permissionless blockchain one by one;

if b.pow_quality≥h·D, the weight of the readjusted block is adjusted to h;

if b.pow_quality<h·D, the weight of the readjusted block is adjusted to 0;

wherein, D is the average difficulty of all blocks of the permissionless blockchain, h is the magnification, h>0.

The present invention also provides a readable storage medium storing executable instructions for performing an permissionless blockchain consensus method with adjusting block weights.

The present invention also provides a data processing terminal for receiving, consensing validation, and storing a block in the P2P network as a consensus node of the P2P network, the data processing terminal comprises a readable storage medium and a processor; the processor is used to call executable instructions in the readable storage medium and perform an permissionless blockchain consensus method with adjusting block weight.

The invention also proposes a P2P network, wherein the consensus node of the P2P network is the aforementioned data processing terminal.

The permissionless blockchain consensus method with adjusting block weight according to the present invention, is used to dynamically adjust the block weights by using the topology relationship of the blocks to increase the balance attack cost, so that the cost of the balance attack can be just as high when the block-generating rate is fast as when the block-generating rate is slow, for allowing the whole network to quickly reach a consensus and improving the system throughput.

DETAILED DESCRIPTION

In order to make the purpose, technical solution and advantages of the present invention clear, the present invention is further described in detail below in combination with the drawings and embodiments. It should be understood that the specific embodiments described herein is used only to interpret the present invention and is not intended to limit it. In addition, the technical features involved in the embodiments of the present invention described below may be combined with each other as long as they do not conflict with each other.

The invention proposes a method for dynamically adjusting the block weight according to the block topology relationship of the chain in the permissionless blockchain to increase the balance attack cost, so that the cost of the balance attack can be just as high when the block-generating rate is fast as when the block-generating rate is slow, and the whole network would be to reach consensus quickly. Moreover, as the block-generating rate is increased, the throughput of the blockchain system can be greatly improved.

Figure 1:
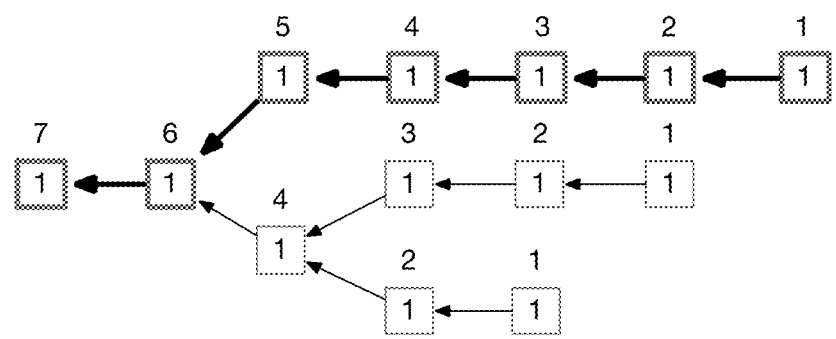
FIG. 1 is a schematic diagram of a pivot chain selected according to the longest chain rule under a typical topology in the prior art
Figure 2:
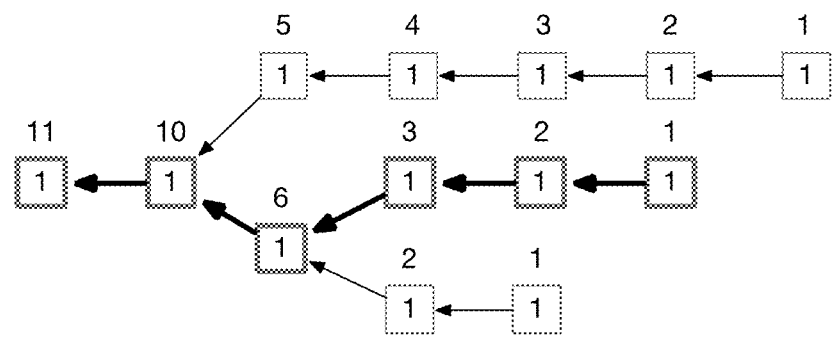
FIG. 2 is a schematic diagram of a pivot chain selected according to the heaviest chain rule under a typical topology in the prior art
Figure 3:
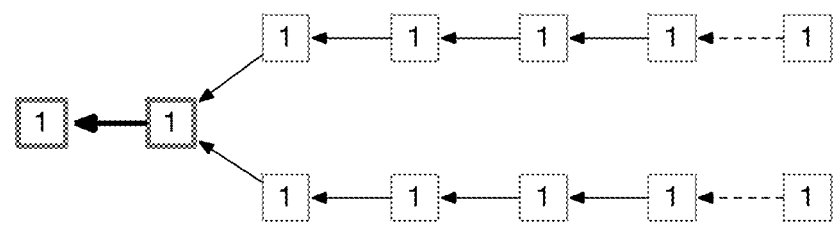
FIG. 3 is a schematic diagram of a block topology which is typically under Balance Attack in the prior art
Figure 4A:
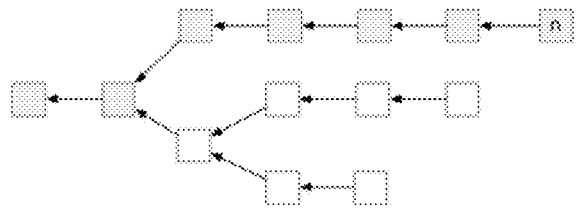
FIG. 4A and FIG. 4B are comparison diagrams of topology information carried by the block n before and after adding reference-edges according to a preferred embodiment of the present invention
Figure 4B:
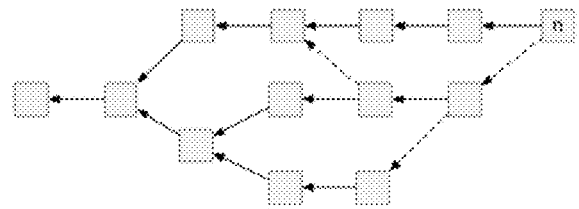

In the blockchain system with only parent edges, each new block generated contains very limited block topological information. Therefore, in addition to the parent edges, reference-edges are added in the present invention, and any one of the blocks can reference blocks which share a common ancestor with the current block but are not on a forked chain. FIG. 4A and FIG. 4B are comparison diagrams of topology information carried by the block n before and after adding reference-edges according to a preferred embodiment of the present invention. As shown in FIG. 4A, an permissionless blockchain topology with only parent edges and without reference-edges is shown. When the node receives the nth block, the topology information carried by the block n is only all the ancestral blocks marked in gray. As shown in FIG. 4B, the permissionless blockchain topology with adding reference-edges is shown. When the node receives the nth block, in addition to all ancestral blocks, the topology information carried by the block n also includes other forked blocks which can be observed by the block n.

Figure 5:
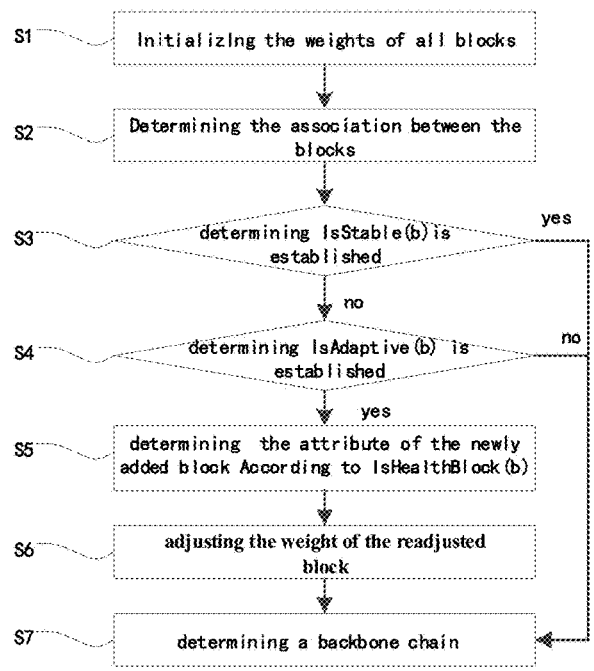
FIG. 5 is a flow chart of the permissionless blockchain consensus method with adjusting block weights according to a preferred embodiment of the present invention

Based on the above-mentioned permissionless blockchain with the parent edge and the reference-edge topologies, the present invention proposes an permissionless blockchain consensus method with adjusting block weights. Referring to FIG. 5, FIG. 5 is a flow chart of the permissionless blockchain consensus method with adjusting block weights according to a preferred embodiment of the present invention. As shown in FIG. 5, the method comprises:

Step S1: performing initialization of the weights, all blocks in the permissionless blockchain are in the block set B, and the weights of all blocks in the permissionless blockchain are set to the same initial value; usually in case, the initial value of the weights is 1.

Step S2: determining a relationship between the blocks in the block set B, that is, determining parent edges and reference-edges of the block relative to a certain block in the permissionless blockchain topology. Wherein, corresponding to the topological structure of the parent edge, the reference-edge is also divided into a parent reference-edge (forward reference-edge)), when all the parent edges of the block and the reference-edge are determined, the relationship between the blocks is also determined.

Step S3: determining whether a new adding block b in the block set B is an unstable block, the determining precess is represented by Instable(b) in a preferred embodiment of the present invention, and the determining process specifically comprises:

Step S31, defining a block set Past(b), Past(b)= $(\cup_{i \in b.pred\_blocks} Past(i)) \cup b.pred\_blocks$, the block set Past (b) is a set including all the blocks that can be reached from the new adding block b through the parent edge (forward reference-edge), and the block set Past(b) does not include the new adding block b itself.

Figure 6:
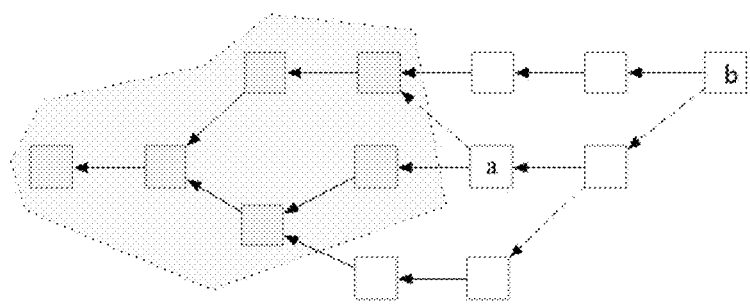
FIG. 6 is a schematic diagram of a block set Past(a) according to a preferred embodiment of the present invention

FIG. 6 is a schematic diagram of a block set Past(a) according to a preferred embodiment of the present invention. For any one of the blocks(for example, block a) in the block set B, the scope of the block set Past(a) indicated by the dotted line is as shown in FIG. 6.

Step S32, defining the sum of the weights PastW(b), PastW(b)=$\Sigma_{i \in Past(b)}$i.weight, the PastW(b) refers to the sum of the weights of all the blocks in the block set Past(b);

Step S33, defining a block set SubT (B, b), SubT(B,b)= $(\cup_{1 \in Child(B,b)} SubT(B,i)) \cup \{b\}$ the block set SubT (B, b) refers to a set including all the blocks in the block set B which can be reached from the parent edge of a new adding block b, and the block set SubT (B, b) includes the new adding block b itself.

Figure 7:
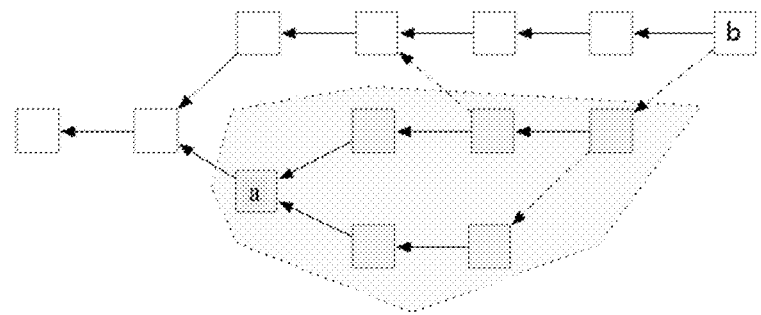
FIG. 7 is a schematic diagram of a block set SubT(a) according to a preferred embodiment of the present invention

FIG. 7 is a schematic diagram of a block set SubT(a) according to a preferred embodiment of the present invention. For any one of the blocks(for example, block a) in the block set B, the scope of the block set SubT(B, a) indicated by the dotted line is as shown in FIG. 7.

Step S34, defining the sum of the weights SubTW(B,b), SubTW(B,b)=$\Sigma_{i \in SubT(B,b)}$i.weight, the SubTW(B,b) refers to the sum of the weights of all the blocks in the block set SubT(B, b).

Step S35, determining whether the new adding block b is stable according to the topology observed forward by the new adding block b, that is, starting from the parent edge of the new adding block b, detecting whether there is a first judgment block x in the forward direction along the parent edge of the new adding block b successively, such that $f(x) > \beta$ and $g(x)/f(x) < \alpha$ was established.

Wherein, f(x)=PastW(b)−PastW(x.parent)−x.weight, g(x) =SubTW(B,x), x.parent is the parent block of the first judgment block x, the x.weight is the weight of the first judgment block x, $\alpha$ and $\beta$ are judgment thresholds. In other words, if the first judgment block x is existence, the IsStable (b) is not established, and the newly added block b is unstable, the newly added block b is an unstable block, and the step S4 is performed; if the first judgment block x is not existence, the IsStable(b) is established, the new block b is stable, and the newly added block b is a stable block, and the weight of the newly added block b is still the initial value and the step S6 proceeds is performed.

Figure 8:
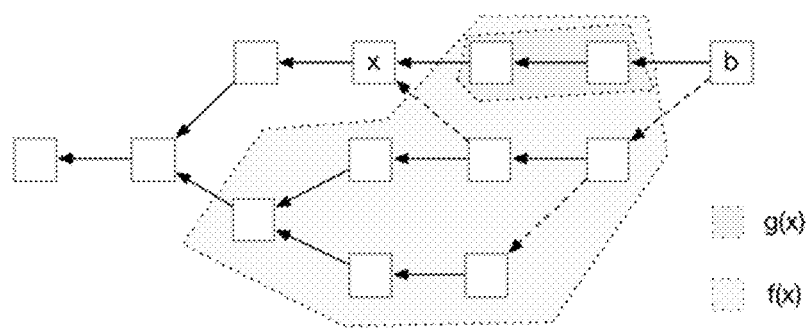
FIG. 8 is a schematic diagram of $f(x)$ and $g(x)$ of block x in a typical topology according to a preferred embodiment of the present invention

FIG. 8 is a schematic diagram of f(x) and g(x) of block x in a typical topology according to a preferred embodiment of the present invention.

Step S4, determining whether the newly added block b is a readjusted block, the determining precess is by IsAdaptive (b) in a preferred embodiment of the present invention, and specifically comprises:

Step S41, defining the sum of weights SubTStableW(B, b), SubTStableW(B, b) refers to the sum of the weights of all stable blocks in SubT(b), SubTStableW(B,b)=$\Sigma_{i \in SubT(B, b), i.stable=True}$i.weight;

Step S42, determining, according to the topology structure observed forword by the newly added block b, whether the precess of the adaptive adjustment weight is needed, that is, starting from the parent block of the newly added block b, and detecting whether there is a blocky along the parent edge of the newly added block b in the forward direction successively, such that SubTW(B, y.parent)>$\beta$ and SubT-Stable(B,y)/SubTW(B,y.parent)<$\alpha$ was established. In other words, if there is a block y that satisfies the condition, the IsAdaptive(b) is established, the newly added block b is a readjusted block, and the weight adjustment of the newly added block b is required, and the step S5 is performed; if there is no block y that satisfies the condition, the IsAdaptive (b) is not established, the newly added block b is a stable block, and the weight of the newly added block b is maintained as an initial value and the step S6 is performed.

Figure 9:
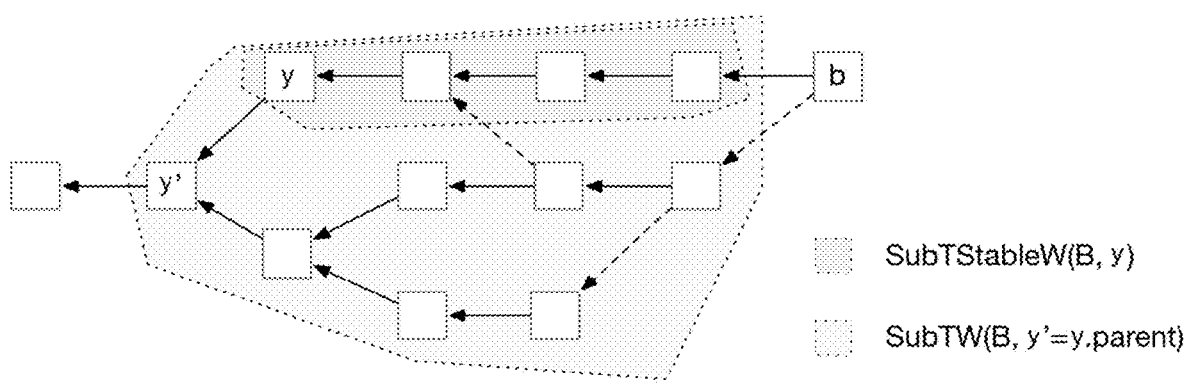
FIG. 9 is a schematic diagram of SubTW (B, y.parent) and SubTStableW (B, y) of a block y under the typical topology according to a preferred embodiment of the present invention

FIG. 9 is a schematic diagram of SubTW (B, y.parent) and SubTStableW (B, y) of a block y under the typical topology according to a preferred embodiment of the present invention.

Step S5, determining the attribute of the newly added block b when the newly added block b is a readjusted block, the determining precess is represented by IsHealthyBlock(b) in a preferred embodiment of the present invention, and specifically comprises:

determining the difficulty of newly added block b, and comparing the difficulty b.pow_quality of the newly added block b with the difficulty threshold h·D of the permissionless blockchain; if b.pow_quality≥h·D, the IsHealthyBlock (b) is established, the newly added block b is a high difficulty block, if b.pow_quality<h·D, then the IsHealthyBlock(b) is not established, the newly added block is a low difficulty block; wherein the D is the average difficulty of all blocks of the permissionless blockchain, the h is the magnification, h>0.

Step S6, adjusting the weight of the readjusted block, for the high difficult block, the weight is adjusted from the initial value to h; for the low difficulty block, the weight is adjusted from the initial value to 0.

In step S7, according to the weight of the newly added block b, the pivot chain of the permissionless blockchain is selected according to the longest chain rule, the heaviest chain rule, or any one of the blockchain consensus rule based on the block weights to select the pivot chain.

Figure 10:
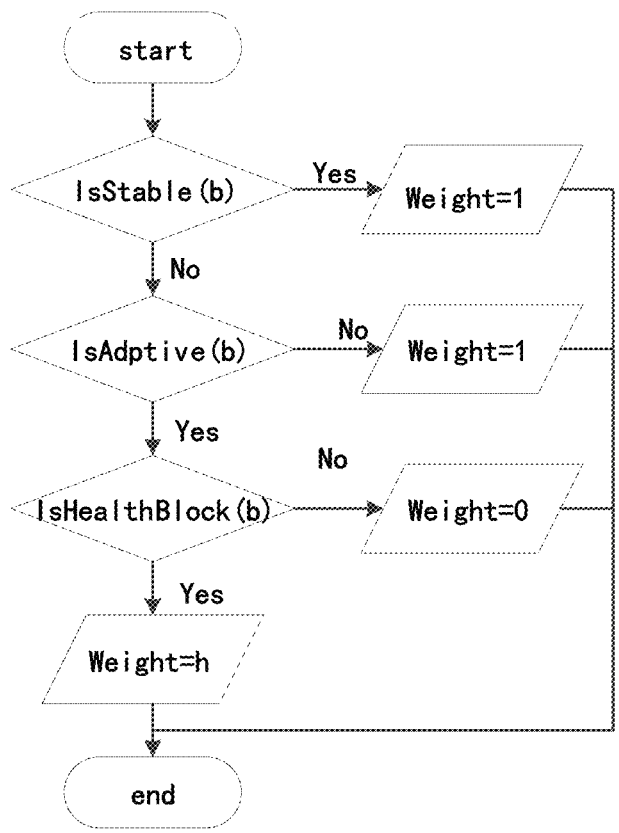
FIG. 10 is a flow chart of dynamically confirming newly added block weights according to a preferred embodiment of the present invention

FIG. 10 is a flow chart of dynamically confirming newly added block weights according to a preferred embodiment of the present invention. As shown in FIG. 10, the permissionless blockchain consensus method with adjusting the weight of the block of the present invention can be summarized as the attribute determine and weight adjustment for the newly added block b, namely:

First, the precess is performed for determining whether the IsStable(b) is established. If the newly added block b is a stable block, it means that most resources are currently concentrated in the pivot chain of the newly added block b for competition of the block-generating, and then the newly added block b has a high probability of being an honest block, the weight of the newly added block b is set to 1; if the newly added block b is an unstable block, then it is necessary to further determine whether the newly added block b needs to dynamically adjust the weight.

Then the precess is performed for determining whether the IsAdaptive(b) is established. If the newly added block b does not need to dynamically adjust the weight, the ancestor blocks representing the pivot chain of the newly added block b is relatively stable. The newly added block b is honest block probability, and the weight of the newly added block b is also set to 1; if the newly added block b need to dynamically adjust the weight adaptively, it needs to further determine whether the newly added block b is a hight difficult block.

Finally, the precess is performed for determining whether the IsHealthyBlock (b) is established. At this time, it can be known that the newly added block b is in an unstable pivot chain. In order to allow the honest nodes in whole network to quickly reach a stable pivot chain, the weight difference of the different difficulty blocks will be increased. As in the following, the weight of the hight difficulty block is adjusted to h, and the weight of the low difficulty block is adjusted to 0, which makes the pivot chain with more hight difficult blocks win the competition quickly, and the pivot chain will tend to be stable after forming a new consensus.

Figure 11:
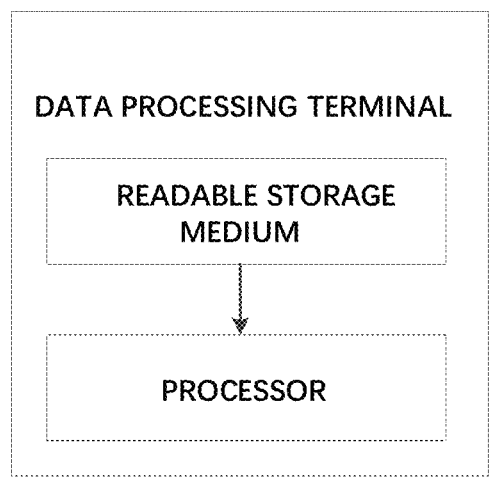
FIG. 11 is a structural schematic diagram of a data processing terminal according to a preferred embodiment of the present invention

FIG. 11 is a structural schematic diagram of a data processing terminal according to a preferred embodiment of the present invention. As shown in FIG. 11, the present invention further provides a data processing terminal, the data processing terminal comprises a processor and a readable storage medium, wherein the processor receives, consensus-verifies and stores the blocks in a P2P network by reading executable instructions stored in the readable storage medium, and the readable storage medium stores executable instructions, when the executable instructions are executed by the processor, the permissionless blockchain consensus method with adjusting the weight of the block is implemented. It can be understood by persons skilled in the art that all or a part of the steps in the above method can be accomplished by a program instructing the related hardware (such as a processor), and the program can be stored in a readable storage medium, such as a read-only memory, a disk, or a CD. All or a part of the steps in the above embodiments may also be implemented by using one or more integrated circuits. Accordingly, each module in the above embodiments may be implemented in the form of hardware (for example, the corresponding functions are implemented by an integrated circuit), or in the form of a software function module (for example, the corresponding functions are implemented by executing programs/instructions stored in a memory by a processor). Embodiments of the present invention are not limited to any particular combination of hardware and software.

Figure 12:
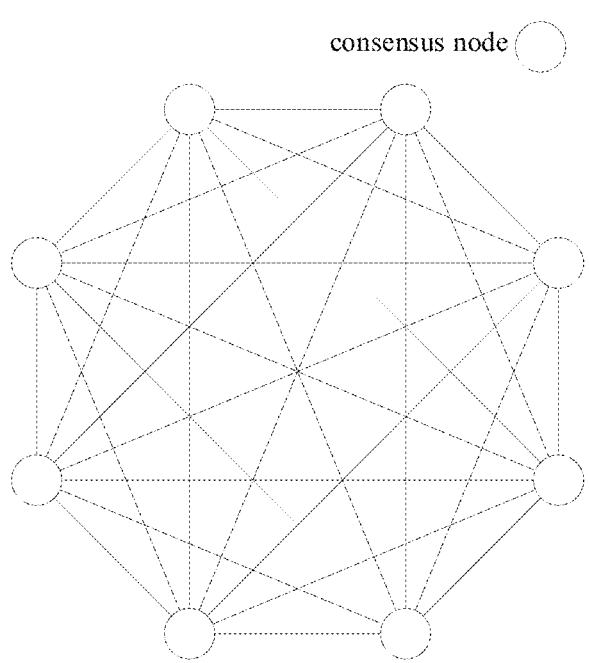
FIG. 12 is a structural schematic diagram of a P2P network according to a preferred embodiment of the present invention

FIG. 12 is a structural schematic diagram of a P2P network according to a preferred embodiment of the present invention. As shown in FIG. 12, the P2P network of the present invention includes a plurality of consensus nodes, and the consensus nodes of the P2P network in the embodiments of the present invention are the data processing terminal described above.

In order to visualize the advantages of this method, the difference between the traditional fixed block weight method and the adaptively adjusted block weight method described in the present invention is exemplified by the longest chain rule. Under the 2.3 GHz, Intel Core i5, 8 GB memory MacBook Pro, simulating with 100 randomly interconnected nodes and 200 ms network delay, for different block difficulty, the percentage of resources of the whole network required by an attacker to maintain at least two forked chains with the same length within 5 minutes are statisticsed, the comparison results are shown in Table 1.

TABLE 1

| Avg block time | 60 s | 30 s | 10 s | 1 s | 0.25 s |
| --- | --- | --- | --- | --- | --- |
| Traditional method | 50% | 47.6% | 42.9% | 27.3% | 4.35% |
| New method | 50% | 50% | 47.7% | 40.5% | 38.1% |

Under the traditional fixed block weight method, the resources required by the attacker to initiate the Balance Attack are drastically reduced as the difficulty of the block-generating is reduced and the time of the block-generating is shortened. In the same scenario, under the permissionless blockchain consensus method with adjusting the weight of the block described in the present invention, the resources required by the attacker to initiate the Balance Attack are maintained at a relatively high level, which are less affected by the shortening the time of the block-generating.

The invention can be used in any permissionless blockchain system through dynamically adjusting the block weights based on the topology relationship of the blocks on the chain, the cost of the Balance Attack is increased, and the cost of the Balance Attack can be just as high when the block-generating rate is fast as when the block-generating rate is slow, so the whole network can quickly reach a consensus. Moreover, as the block-generating rate of the block is increased, the system throughput can be greatly improved.

The advantage of the present invention is that the block weight is dynamically adjusted by using the topology relationship of the chain to increase the balance attack cost, so that the cost of the balance attack can be just as high when the block-generating rate is fast as when the block-generating rate is slow, for allowing the whole network to quickly reach a consensus and improve system throughput.

Finally, it should be noted that the above embodiments are only used to describe the technical solution of the present invention and not to restrict it. Although the present invention is described in detail with reference to the above embodiments, persons skilled in the art should understand that the present invention may be modified according to the technical solution recorded in the above embodiments or some of technical features thereof can be replaced equally; and such modifications or equivalent replacements shall not make the essence of the corresponding technical solution deviate from the spirit and scope of technical solution in each embodiment of the present invention.

What is claimed is:

1. An permissionless blockchain consensus method with adjusting block weights, comprises:
    an initialization step, for setting weights of all blocks in the permissionless blockchain to the same initial value;
    an association step, for determining parent edges, parent edges (forward reference-edges) of any one of the blocks in the permissionless blockchain according to the blockchain topology;
    a first determining step, for detecting whether a first judgment block x is in blocks contained by the parent edge of a newly added block b; if yes, determining that the newly added block b is an unstable block and transferring to a second determining step, and otherwise, determining the newly added block b is a stable block and transferring to a pivot chain consensus step; wherein, the first judgment block x is used to judge whether the new block b is stable block, and the first judgment block is x a block whose stability is not up to standard in the parent blocks of the new block x, the fewer direct descendants of the block, the more unstable the block is;
    the second determining step, for detecting whether a second judgment block y is in the stable block contained by the parent edge of the newly added block b; if yes, determining the newly added block b is a readjusted block and transferring to a weight adjustment step, otherwise, determining the newly added block b is a stable block and transferring to a pivot chain consensus step; wherein, the second judgment block y is used to judge whether the new block b is healthy block, and the second judgment block y is a block whose healthy degree is not up to standard in the parent blocks of the new block b, the more unstable blocks in the direct descendants of the block, the less healthy the block is;
    the weight adjustment step, for adjusting the weight of the readjusted block; and
    the pivot chain consensus step, for selecting the pivot chain of the permissionless blockchain based on the weight of each block according to the blockchain consensus rule;
    wherein, for the block set B of the permissionless blockchain, all the blocks which can be reachable by the parent edge (forward reference-edge) of any one block in the block set B, are in the forward block set Past (●) of the any one block in the block set B, and the sum of the weights of all blocks in Past (●) is the sum of the forward weights PastW(●) of the any one block in the block set B; all the blocks referenced by the parent edges of any one of the blocks, are in the backward block set SubT(●) of the any one block in the block set B, the sum of the weights of all blocks in the SubT(●) is the sum of the backward weights SubTW(B,●) of the any one block in the block set B, and
    the first determining step specifically comprises:
    detecting whether a first judgment block x is in the blocks contained by the parent edge of the newly added block b, so that $f(x)>\beta$ and $g(x)/f(x)<\alpha$ is established;
    if yes, the newly added block b is determined to be an unstable block, otherwise, the newly added block b is determined to be a stable block;
    wherein, $\alpha$ and $\beta$ are the judgment thresholds, $f(x)=PastW(b)-PastW(x.parent)-x.weight$, $g(x)=SubTW(B,x)$, and the x.parent is the parent block of the first judgment block x, the x.weight is the weight of the first judgment block x.

2. The permissionless blockchain consensus method of claim 1, wherein, for block set B, the sum of the weights of stable blocks in all blocks referenced by parent edges of any one of the blocks in the block set B is the sum of the backward stability weights SubTStableW(B,●) of the any one of the blocks in the block set B, and;
    the second determining step specifically comprises:
    detecting whether there is the second judgment block y in the stable blocks contained by the parent edge of the newly added block b, so that $SubTW(B, y.parent)>\beta$, and
    $SubTStableW(B, y)/SubTW(B, y.parent)<\alpha$ is established;
    if yes, the newly added block b is determined to be readjusted block, and otherwise, the newly added block b is determined to be a stable block;
    wherein y.parent is the parent block of the second judgment blocky.

3. The permissionless blockchain consensus method of claim 1, wherein, for the block set B of the permissionless blockchain, all the blocks which can be reachable by the parent edge (forward reference-edge) of any one block in the block set B, are in the forward block set Past (●) of the any one block in the block set B, and the sum of all blocks in Past (●) is the sum of the forward blocks in the block set B; all the blocks referenced by the parent edges of any one of the blocks, are in the backward block set SubT(●) of the blocks of any one block in the block set B, the sum of all blocks in the SubT(●) is the sum of the backward blocks of any one block in the block set B, and
    the first determining step specifically comprises:
    detecting whether a first judgment block x is in the blocks contained by the parent edge of the newly added block b, so that $f(x)>\beta$ and $g(x)/f(x)<\alpha$ is established;
    if yes, the newly added block b is determined to be an unstable block, otherwise, the newly added block b is determined to be a stable block;

wherein, α and β are the judgment thresholds, $f(x)=|Past(b)|-|Past(x.parent)|-1$, $g(x)=|SubT(B, x)|$, and the x.parent is the parent block of the first judgment block x.

4. The permissionless blockchain consensus method of claim 3, wherein, for block set B, the sum of stable blocks in all blocks referenced by parent edges of any one of the blocks in the block set B is the sum of the backward stability blocks of the any one of the blocks in the block set B, and;
the second determining step specifically comprises:
detecting whether there is the second judgment block y in the stable blocks contained by the parent edge of the newly added block b, so that $SubTW(B, y.parent)>β$, and
$SubTStableW(B, y)/SubTW(B, y.parent)<α$ is established;
if yes, the newly added block b is determined to be readjusted block, and otherwise, the newly added block b is determined to be a stable block;
wherein y.parent is the parent block of the second judgment blocky.

5. The permissionless blockchain consensus method of claim 1, wherein the weight adjustment step comprises:
receiving all of the readjusted blocks;
comparing the difficulty b.pow_quality of the readjusted block, with the difficulty threshold h·D of the permissionless blockchain one by one;
if $b.pow\_quality \geq h·D$, the weight of the readjusted block is adjusted to h;
if $b.pow\_quality < h·D$, the weight of the readjusted block is adjusted to 0;
wherein, D is the average difficulty of all blocks of the permissionless blockchain, h is the magnification, h>0.

6. A readable storage medium storing executable instructions, wherein the executable instructions is for performing an permissionless blockchain consensus method with adjusting block weights as claimed of claim 1.

7. An permissionless blockchain consensus system with adjusting block weights, comprises:
an initialization module, configured to set weights of all blocks in the permissionless blockchain to the same initial value;
an association module, configured to determine a parent edge(a forward reference-edge) of each block according to the blockchain topology;
a first determining module, configured to detect whether a first judgment block x is in blocks contained by a parent edge of the newly added block b; if yes, determining the newly added block b is an unstable block, otherwise, determining the newly added block b is a stable block; wherein, the first judgment block x is used to judge whether the new block b is stable block, and the first judgment block is x a block whose stability is not up to standard in the parent block of the new block x, the fewer direct descendants of the block, the more unstable the block is;
a second determining module, configured to detect whether a second judgment block Y is in the stable block contained by the parent edge of the newly added block b; if yes, determining the newly added block b is a readjusted block, otherwise, the newly added block b is a stable block;
a weight adjustment module, configured to adjust the weight of the readjusted block determined by the second determining module; wherein, the second judgment block y is used to judge whether the new block b is healthy block, and the second judgment block y is a block whose healthy degree is not up to standard in the parent block of the new block b, the more unstable blocks in the direct descendants of the block, the less healthy the block is;
a pivot chain consensus module, configured to select the pivot chain of the permissionless blockchain based on the weight of each block according to the blockchain consensus rule;
wherein for the block set B of the permissionless blockchain, all the blocks which can be reachable by the parent edge of the block (forward reference-edge) of any one block in the block set B, are in the forward block set Past (●) of the any one block in the block set B, and the sum of the weights of all blocks in Past (●) is the sum of the forward weights PastW(●) of the any one block in the block set B; all the blocks referenced by the parent edges of any one of the blocks, are in the backward block set SubT(●) of the any one block in the block set B, the sum of the weights of all blocks in the SubT(●) is the sum of the backward weights SubTW(B,●) of the any one block in the block set B, and
the first determining step specifically comprises:
detecting whether there is the first judgment block x in the blocks contained by the parent edge of the newly added block b; so that $f(x)>β$ and $g(x)/f(x)<α$ is established;
if yes, the newly added block b is determined to be an unstable block, otherwise, the newly added block b is determined to be a stable block;
wherein, α and β are the judgment thresholds, $f(x)=PastW(b)-PastW(x.parent)-x.weight$, $g(x)=SubTW(B,x)$, and x.parent is the parent block of the first judgment block x, x.weight is the weight of the first judgment block x.

8. The permissionless blockchain consensus system of claim 7, wherein, for block set B, the sum of the weights of all stable blocks in blocks referenced by parent edges of any one of the blocks in the block set B is the sum of the backward stability weights SubTStableW(B,●) of the any one of the blocks in the block set B, and;
the second determining step specifically comprises:
detecting whether there is the second judgment block Y in the stable blocks contained by the parent edge of the newly added block b, so that $SubTW(B, y.parent)>β$, and
$SubTStableW(B, y)/SubTW(B, y.parent)<α$ is established;
if yes, the newly added block b is determined to be readjusted block, and otherwise, the newly added block b is determined to be a stable block;
wherein y.parent is the parent block of the second judgment block Y.

9. The permissionless blockchain consensus system of claim 7 wherein, for the block set B of the permissionless blockchain, all the blocks which can be reachable by the parent edge of the block (forward reference-edge) of any one block in the block set B, are in the forward block set Past (●) of the any one block in the block set B, and the sum of all blocks in Past (●) is the sum of the forward blocks in the block set B; all the blocks referenced by the parent edges of any one of the blocks, are in the backward block set SubT(●) of the blocks of any one block in the block set B, the sum of all blocks in the SubT(●) is the sum of the backward blocks of any one block in the block set B, and
the first determining step specifically comprises:

detecting whether a first judgment block x is in the blocks contained by the parent edge of the newly added block b, so that $f(x)>\beta$ and $g(x)/f(x)<\alpha$ is established;

if yes, the newly added block b is determined to be an unstable block, otherwise, the newly added block b is determined to be a stable block;

wherein, $\alpha$ and $\beta$ are the judgment thresholds, $f(x)=|Past(b)|-|Past(x.parent)|-1$, $g(x)=|SubT(B, x)|$, and the x.parent is the parent block of the first judgment block x.

10. The permissionless blockchain consensus system of claim 9 wherein, for block set B, the sum of stable blocks in all blocks referenced by parent edges of any one of the blocks in the block set B is the sum of the backward stability blocks of the any one of the blocks in the block set B, and;

the second determining step specifically comprises:

detecting whether there is the second judgment block y in the stable blocks contained by the parent edge of the newly added block b, so that $SubTW(B, y.parent)>\beta$, and $SubTStableW(B, y)/SubTW(B, y.parent)<\alpha$ is established;

if yes, the newly added block b is determined to be readjusted block, and otherwise, the newly added block b is determined to be a stable block;

wherein y.parent is the parent block of the second judgment blocky.

11. The permissionless blockchain consensus system of claim 8, wherein the weight adjustment module comprises:

a receiving submodule, for receiving all of the readjusted blocks;

a comparing submodule, for comparing the difficulty b.pow_quality of the readjusted blocks with the difficulty threshold h·D of the permissionless blockchain one by one;

if b.pow_quality≥h·D, the weight of the readjusted block is adjusted to h;

if b.pow_quality<h·D, the weight of the readjusted block is adjusted to 0;

wherein, D is the average difficulty of all blocks of the permissionless blockchain, h is the magnification, h>0.

12. A data processing terminal, which is used as a consensus node of a P2P network, receives, consensus-verifies, and stores a block in the P2P network, and wherein the data processing terminal includes:

a readable storage medium as claimed in claim 6;

a processor that retrieves and executes executable instructions in the readable storage medium to perform an permissionless blockchain consensus method of adjusting block weights.

13. A P2P network, wherein the consensus node of the P2P network is the data processing terminal of claim 12.

* * * * *